United States Patent
Swedberg et al.

(10) Patent No.: US 7,450,130 B2
(45) Date of Patent: Nov. 11, 2008

(54) ADAPTIVE SCHEDULING TO MAINTAIN SMOOTH FRAME RATE

(75) Inventors: Gregory D. Swedberg, Bellevue, WA (US); Prashant Ratanchandani, Sammamish, WA (US); Greg Schechter, Seattle, WA (US); Glenn F. Evans, Kirkland, WA (US); Leonardo E. Blanco, Redmond, WA (US); Kenneth S. Reneris, Bellevue, WA (US); Sameer Avinash Nene, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/228,002

(22) Filed: Sep. 14, 2005

(65) Prior Publication Data

US 2007/0057952 A1    Mar. 15, 2007

(51) Int. Cl.
G09G 5/36 (2006.01)
G06F 12/06 (2006.01)

(52) U.S. Cl. ........................ 345/545; 345/473; 345/474; 345/535; 348/459; 348/556; 715/788

(58) Field of Classification Search ......... 345/473–474, 345/535; 348/459, 556; 715/788
See application file for complete search history.

(56) References Cited

U.S. PATENT DOCUMENTS

| | | | |
|---|---|---|---|
| 6,304,297 B1 * | 10/2001 | Swan | 348/556 |
| 6,542,198 B1 * | 4/2003 | Hung et al. | 348/459 |
| 6,919,900 B2 * | 7/2005 | Wilt | 345/535 |
| 7,034,834 B2 * | 4/2006 | Blanco et al. | 345/473 |
| 7,161,599 B2 * | 1/2007 | Beda et al. | 345/473 |
| 2003/0076328 A1 * | 4/2003 | Beda et al. | 345/503 |
| 2003/0084181 A1 * | 5/2003 | Wilt | 709/233 |
| 2004/0239677 A1 * | 12/2004 | Mutanen et al. | 345/545 |
| 2006/0061576 A1 * | 3/2006 | Blanco et al. | 345/473 |

* cited by examiner

Primary Examiner—Jin-Cheng Wang
(74) Attorney, Agent, or Firm—Workman Nydegger (57) ABSTRACT

Described is an adaptive scheduler associated with a desktop window manager that dynamically controls the rate at which graphics frames are composed. Values corresponding to performance when composing a frame are measured, and the frame composition rate is adjusted as necessary based on the values. The measured data is sampled to provide smooth adjustments. The sampled data is evaluated as to whether the current frame rate is too slow, too fast, or acceptable. If too slow, the frame rate may increased relative to the refresh rate, while if too fast, the frame rate is decreased relative to the refresh rate. In one implementation, the frame rate is too fast if a count of missed frames achieves a missed threshold value, or if a count of late frames achieves a late threshold value. The frame rate is too slow if a count of early frames exceeds an early threshold value.

12 Claims, 9 Drawing Sheets

ADAPTIVE SCHEDULING TO MAINTAIN SMOOTH FRAME RATE

BACKGROUND

In viewing video and computer graphics, particularly animated graphics, the human eye is very sensitive to discontinuities in frame rate. Application programs generally have been able to control their frame rate because they draw directly to the frame buffer, or use hardware hooks to target a particular rate. However, one contemporary operating system being developed by Microsoft Corporation provides a desktop window manager that takes over control of the desktop, whereby application programs no longer present directly to the screen, nor have as direct of access to hardware timing. Instead, the desktop window manager intercepts the graphic updates from application program windows, and combines or composes them on a regular schedule to create the visible desktop. The desktop window manager thus controls when content reaches the screen, and to avoid distracting glitches and tearing, needs to maintain smooth predictable frame rates for the content.

Composing the desktop requires a significant amount of the total computing power available, particularly in the case of graphics capabilities. Previously graphics processing unit resources were used only by application programs; however the desktop window manager requires that graphics resources be balanced among many simultaneous users. Further, as an operating system or otherwise shared component, the desktop window manager has to judiciously use resources so that resources are conserved for use by the application programs.

SUMMARY

Briefly, various aspects of the present invention are directed towards a desktop window manager that manages the load it places on the system, including by dynamically controlling the frame composition rate at which it composes. A set of values corresponding to performance with respect to composing a frame is measured, and the rate of composing frames based on the set of values is adjusted as necessary.

In one implementation, the measured data is sampled over a number of frame rate composition times, such as over a time period. A determination is made from the sampled data as to whether the data indicates a pattern of a current frame rate being too slow, too fast, or acceptable relative to a graphics subsystem refresh rate. If the pattern indicates the frame rate is too slow, the frame rate may be increased relative to the refresh rate. If the pattern indicates the frame rate is too fast, the frame rate is decreased relative to the refresh rate.

In one implementation, a window manager receives graphics instructions from application programs and composes frames of video data based on those instructions for sending to a graphics subsystem. An adaptive scheduler coupled to the window manager controls a rate of frame composition of the window manager based on measured performance data with respect to composing frames. In general, the adaptive scheduler adjusts the rate of composing frames by decreasing the rate when a count of missed frames achieves a missed threshold value. If the missed threshold is not achieved, the adaptive scheduler adjusts the rate of composing frames by decreasing the rate if a count of late frames achieves a late threshold value. If the late threshold is not achieved, the adaptive scheduler adjusts the rate of composing frames by increasing the rate if a count of early frames exceeds an early threshold value, e.g., up to the refresh rate of the graphics subsystem.

Other advantages will become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
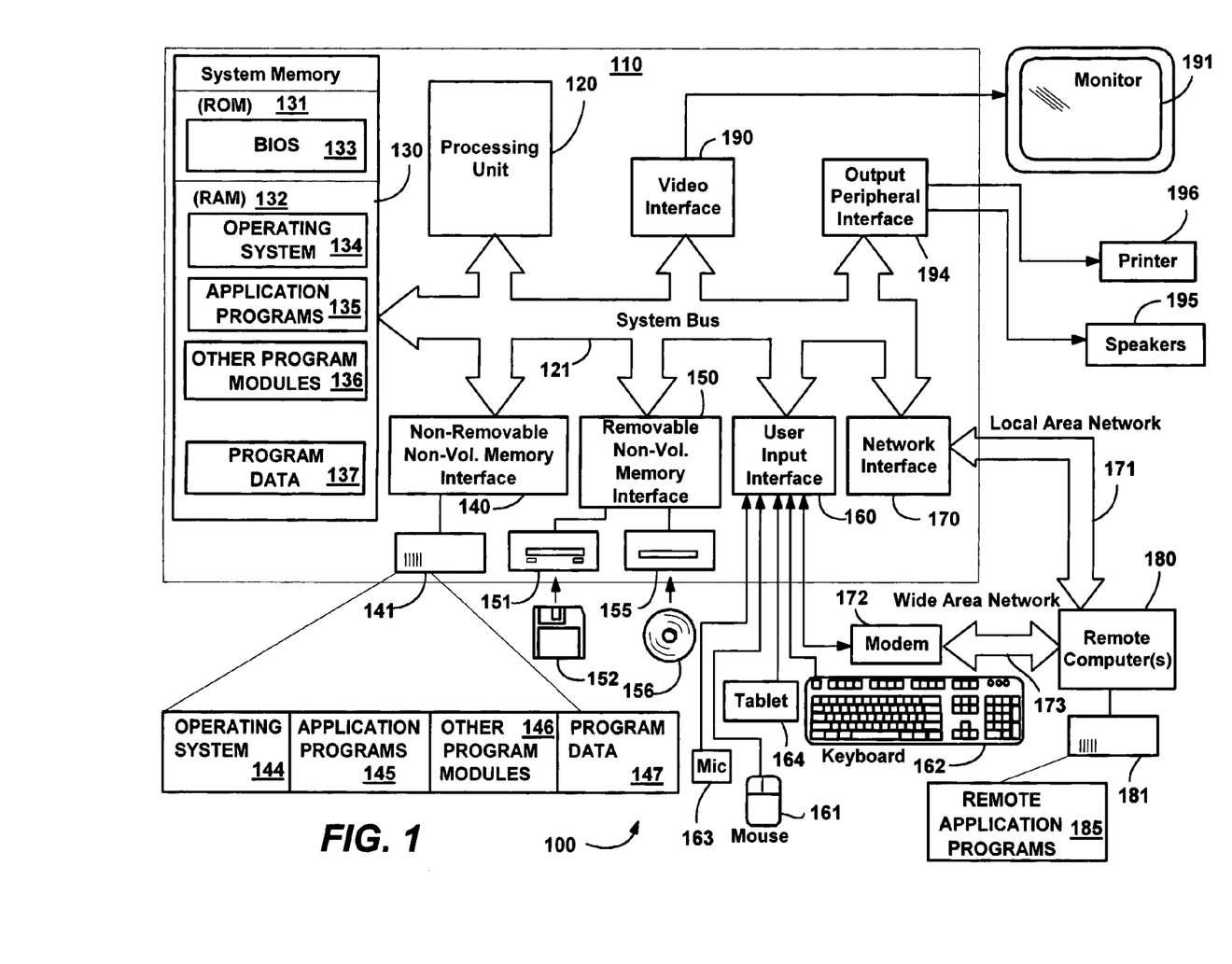
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Adaptive Scheduling to Maintain Smooth Frame Rate

Various aspects of the technology described herein are directed towards measuring the performance of a component with respect to how much time is taken by that component to compose a frame, wherein a frame comprises a rendered image representing a point or interval of time. The component then adapts the frame rate performance as necessary based on the measured to provide a smooth frame composition rate relative to the refresh rate of the graphics subsystem. In general, a number of times are sampled to determine a pattern, and the frame composition rate is adjusted based on that pattern. However, as will be understood, the present invention is not limited to sampling, patterns or any of the example computations described herein. As such, any of the examples mentioned herein are non-limiting, and the present invention may be used various ways that provide benefits and advantages in computing in general.

Figure 2:
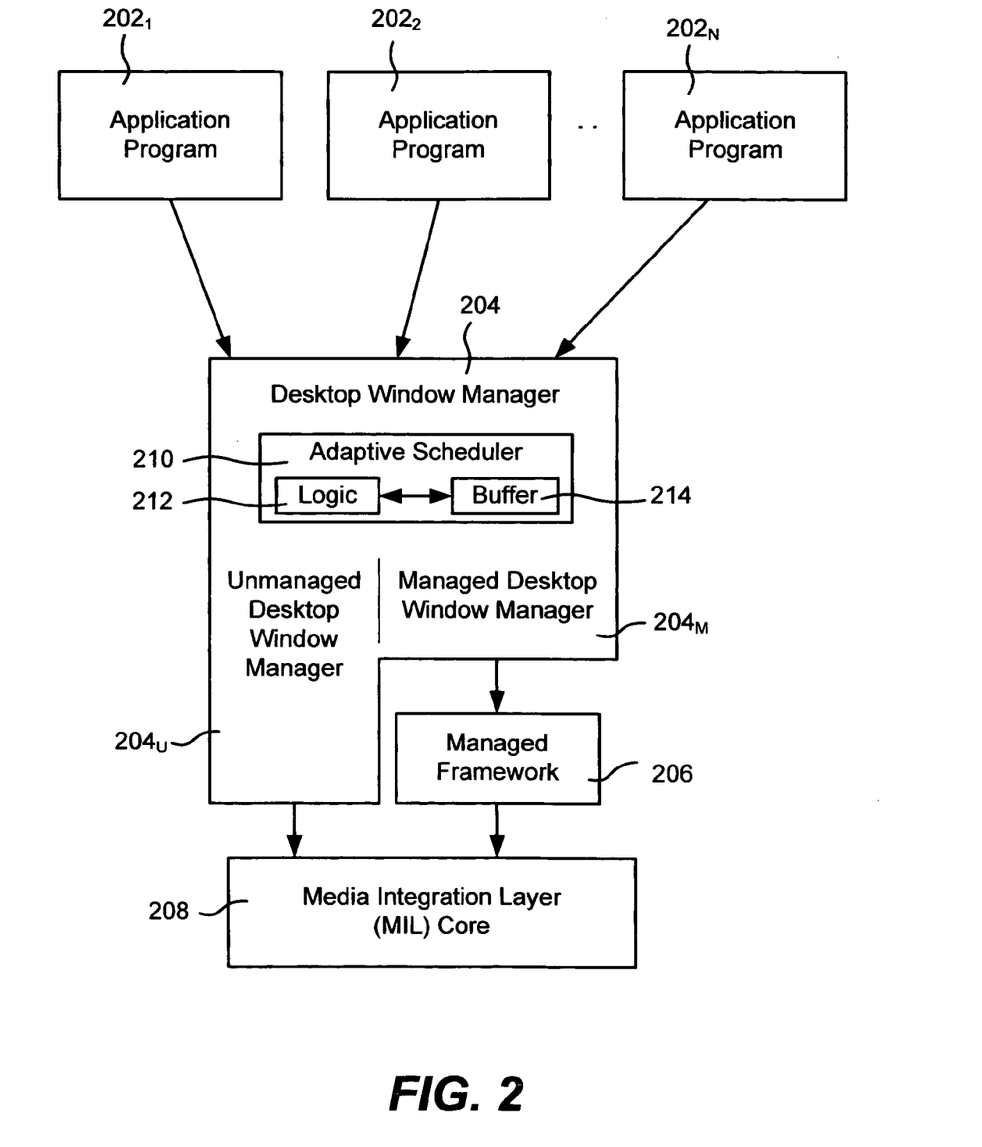
FIG. 2 is a block diagram representing an example architecture in which a desktop window manager receives application program content and other window-related messages.

Turning to FIG. 2 of the drawings, there is shown a block diagram generally representing an exemplary architecture of system components for providing a graphical windowing environment experience. In general, application programs $202_1$-$202_N$ output graphics instructions, which may be immediate mode (e.g., GDI or DX/DirectX) graphics commands and/or bitmaps intended by the application to be directly output to the display, or retained mode graphics instructions (e.g., vector graphics commands) directed to a drawing surface of a scene graph/rendering tree for later output. Whether immediate or retained mode, a desktop window manager 204 may route the graphics commands and bitmaps to per-application retained mode surfaces, and composes the surfaces for rendered output. Alternatively, the system may directly compose from at least one of the application program's graphics instruction stream without requiring an intermediate surface.

The desktop window manager 204 may be written with any technology. For example, as represented in FIG. 2, the desktop window manager 204 may include an unmanaged desktop window manager component $204_U$ (e.g., written in native processor specific code) and/or a managed desktop window manager component $204_M$ (e.g., written in managed .NET code/Common Language Runtime or CLR). Note that these may be separate components, and are only examples; any numbers of variations are capable of performing equivalent operations above a scene graph system.

In general, if present, the unmanaged desktop window manager component $204_U$ calls functions of a media integration layer (MIL) core 208, while if present, the managed desktop window manager component $204_M$ calls functions of a managed (e.g., CLR/.NET) framework 206, which in turn calls the media integration layer (MIL) core 208. In one implementation, the managed framework 206 allows programs to output their user interface code in markup language such as XAML, and also provides higher-level operations such as styling, data binding and inheritance. Note that an alternative window manager may be written in managed code yet use the low level MIL functionality, e.g., rather than XAML.

One primary function of the desktop window manager 204 is to process the off-screen surfaces to which the application programs $202_1$-$202_N$ have provided content and other instructions, and/or directly compose from application program graphics instructions. The desktop window manager 204 knows about these surfaces, and receives notifications about when they change, as well as when they are moved, resized and so forth. The desktop window manager 204 processes this information, and, having access to the surfaces and/or instruction streams (corresponding to windows) of the application programs $202_1$-$202_N$, is responsible for compositing them for rendering to the display.

Note that because the desktop window manager 204 sets up the composition of these windows, the desktop window manager 204 can perform additional functionality that cannot be done in operating systems in which applications write directly to the screen. For example, the desktop window manager 204 can take some or all of the various existing windows and show supplemental displays of existing windows, such as live thumbnails or a three-dimensional carousel-type configuration displaying live content. Virtually any other types of rendered output using the surfaces as sources of graphics data are feasible. Such supplemental displays of the client area may be rendered independent of whether the client area is also being shown in its corresponding program window at the same time.

One aspect of the desktop window manager 204 is directed towards avoiding visible glitches that result from discontinuities in frame composition rate. To this end, the desktop window manager composes arbitrary content at a smooth, consistent frame rate, in general by adaptively scaling the frame rate as necessary based on the current system load with respect to the system's capabilities. In one implementation, the desktop window manager 204 benefits from having a sufficient scheduling resolution and precision to support a high frame rate; the composition loop rarely or never blocks, other than waiting for the next frame time.

Ideally the desktop window manager 204 will compose each frame at a rate matching the monitor refresh rate, wherein each refresh comprises a single scan of the display by the video hardware, corresponding to an atomic interval of time in which anything can be displayed. However the current system load may make composition at the (typically high) refresh rate impossible.

As represented in FIG. 2, the desktop window manager 204 provides a mechanism, referred to herein as an adaptive scheduler 210, to adjust its frame composition rate based on actual performance which depends on available resources. For a better visual experience, the desktop window manager 204 will consistently use a lower frame rate when necessary, instead of frequently changing between frame rates. To this end, in one implementation, the adaptive scheduler 210 of the desktop window manager 204 makes its decisions based on data collected over a period of time, rather than just the data available at the current instant.

The following table includes some example definitions which will be used herein and with reference to FIGS. 3A-3D for purposes of explanation:

| | |
|---|---|
| TFrame | Display time for current frame |
| TNext | Time the next frame will be needed |
| TMargin | Difference between when a frame is ready and when it is needed for display |
| TFrameBegin | Start time of work on current frame |
| TFrameEnd | End time of work on current frame |
| TFrameBudget | Time allotted for a frame to render |
| RComposition | The rate at which frames are being composed. |
| RRefresh | The rate at which the monitor is refreshed |
| CRefresh | Number of refreshes to display the frame |

As described above, the desktop window manager 204 generally should compose at the same frame rate as the monitor refresh rate, however there are times when the system is loaded and the desktop window manager 204 cannot keep up with the refresh rate. The desktop window manager 204 includes a way to monitor system performance and adjust the frame composition rate when needed. To this end, the adaptive scheduler 210 provides a control system that adjusts its frame composition rate as the system load increases and decreases. The adaptive scheduler 210 attempts to ensure that each composed frame is complete and ready to display in time for the correct video refresh.

Figure 3A:
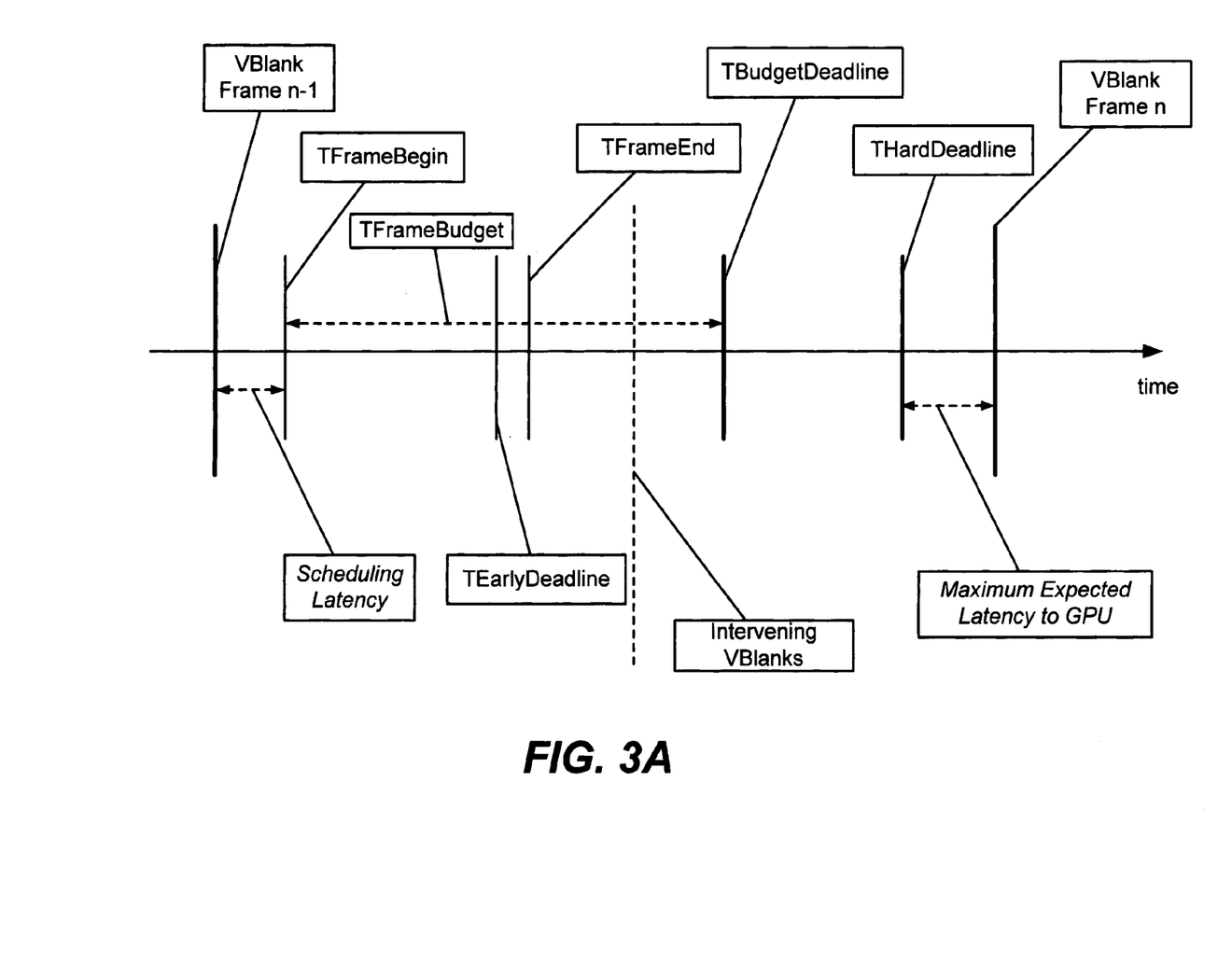
FIGS. 3A-3D are representations of timelines showing how the time taken to compose a frame varies relative to thresholds and other times.

For example, with reference to the timeline of FIGS. 3A-3D, using TBudgetDeadline as the time in which a frame must be complete (TFrameEnd) to stay within the time budget, FIG. 3A shows such a situation. In FIG. 3A, TFrameEnd, when the frame is ready, occurs before TBudgetDeadline. Note that in FIGS. 3A-3D, the frame is composed between a previous frame (n−1) and the next frame (n), starting at TFrameBegin, which follows a scheduling latency time.

Figure 3B:
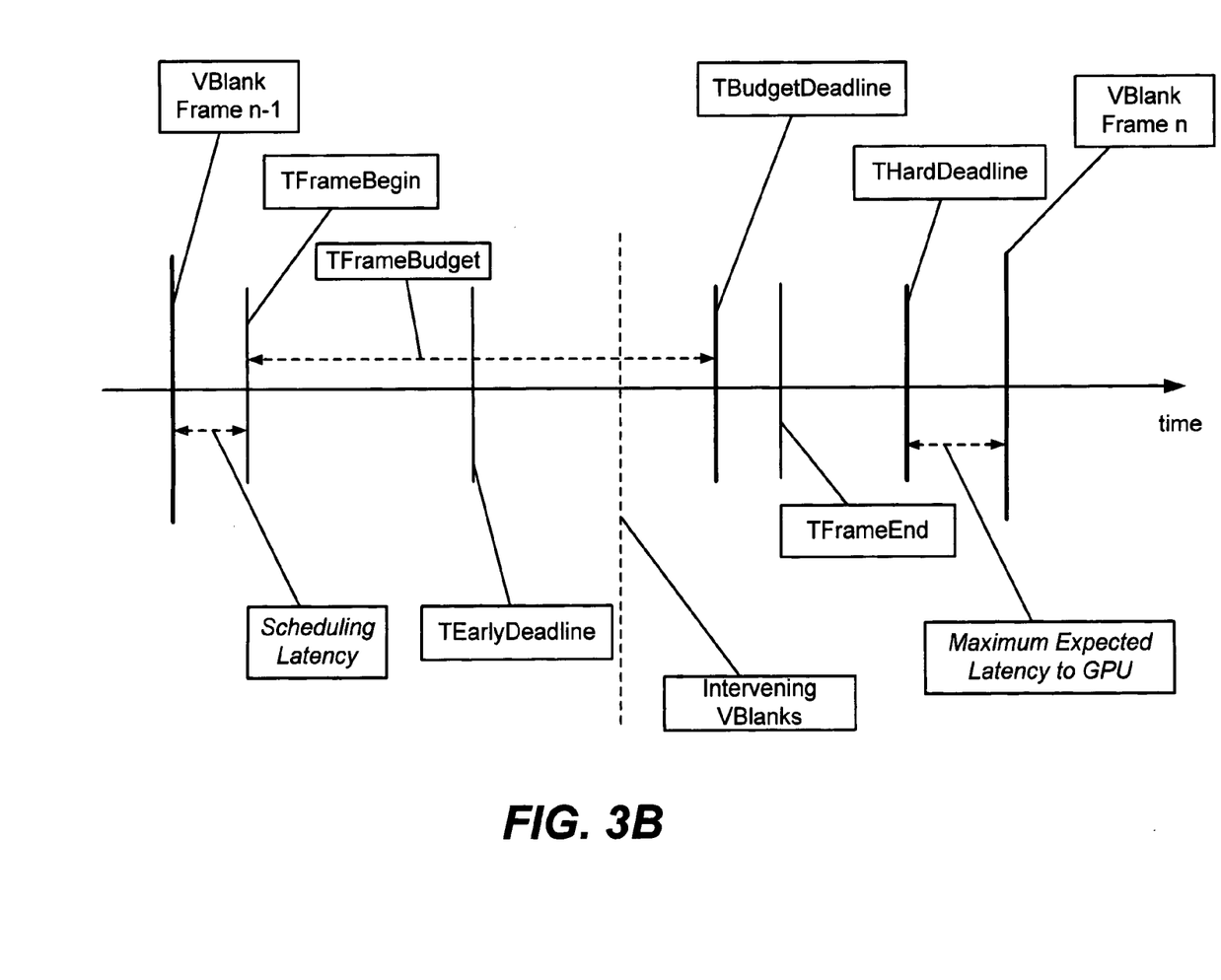
Figure 3C:
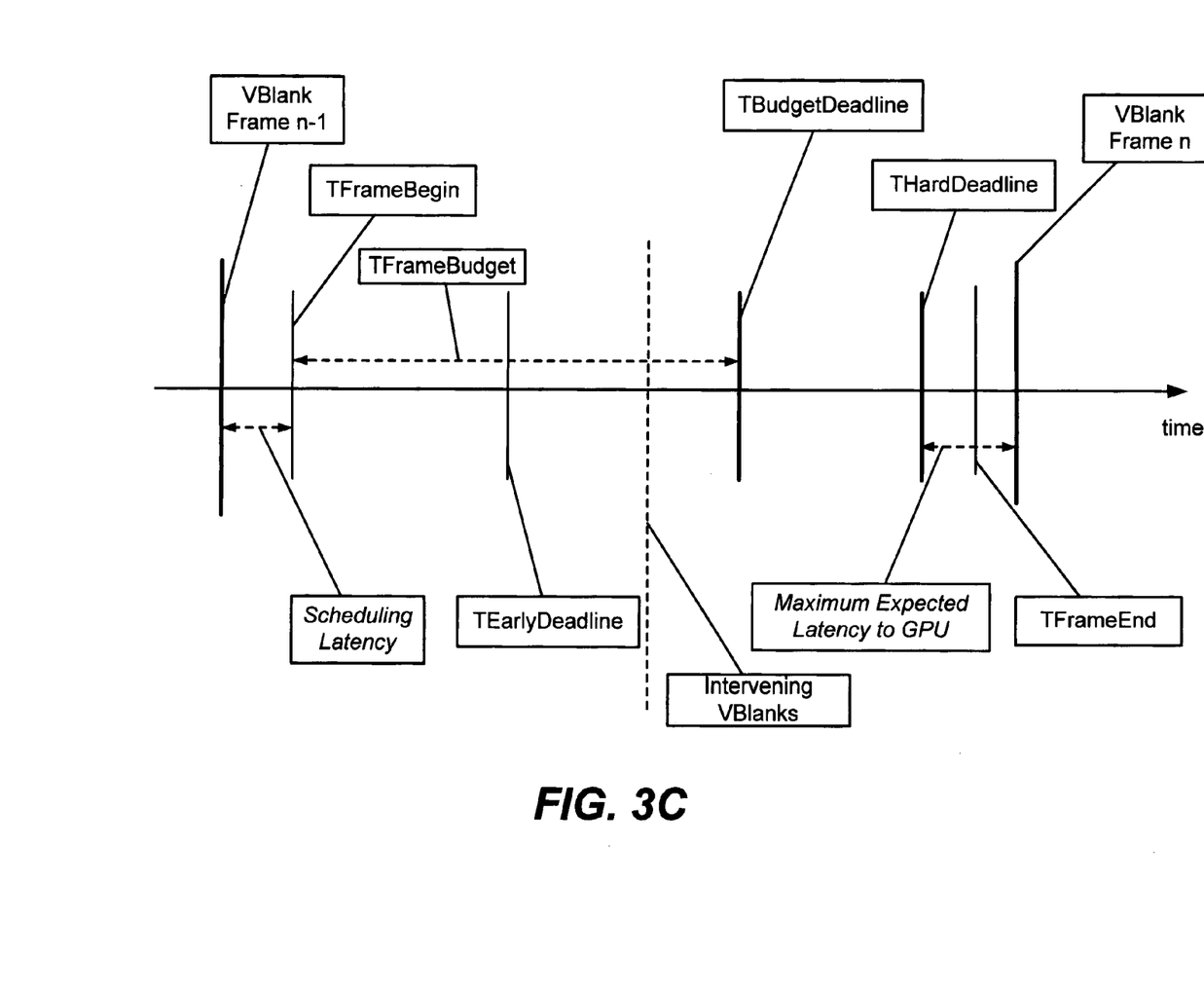

In the event that TFrameEnd is greater than TBudgetDeadline, as represented in FIG. 3B, the composition process is using too much time, whereby the adaptive scheduler 210 will consider reducing the frame composition rate, e.g., depending on how many frames were late, as described below. If TFrameEnd is greater than THardDeadline (FIG. 3C), the system has glitched, and the adaptive scheduler 210 should almost certainly reduce the frame composition rate.

Figure 3D:
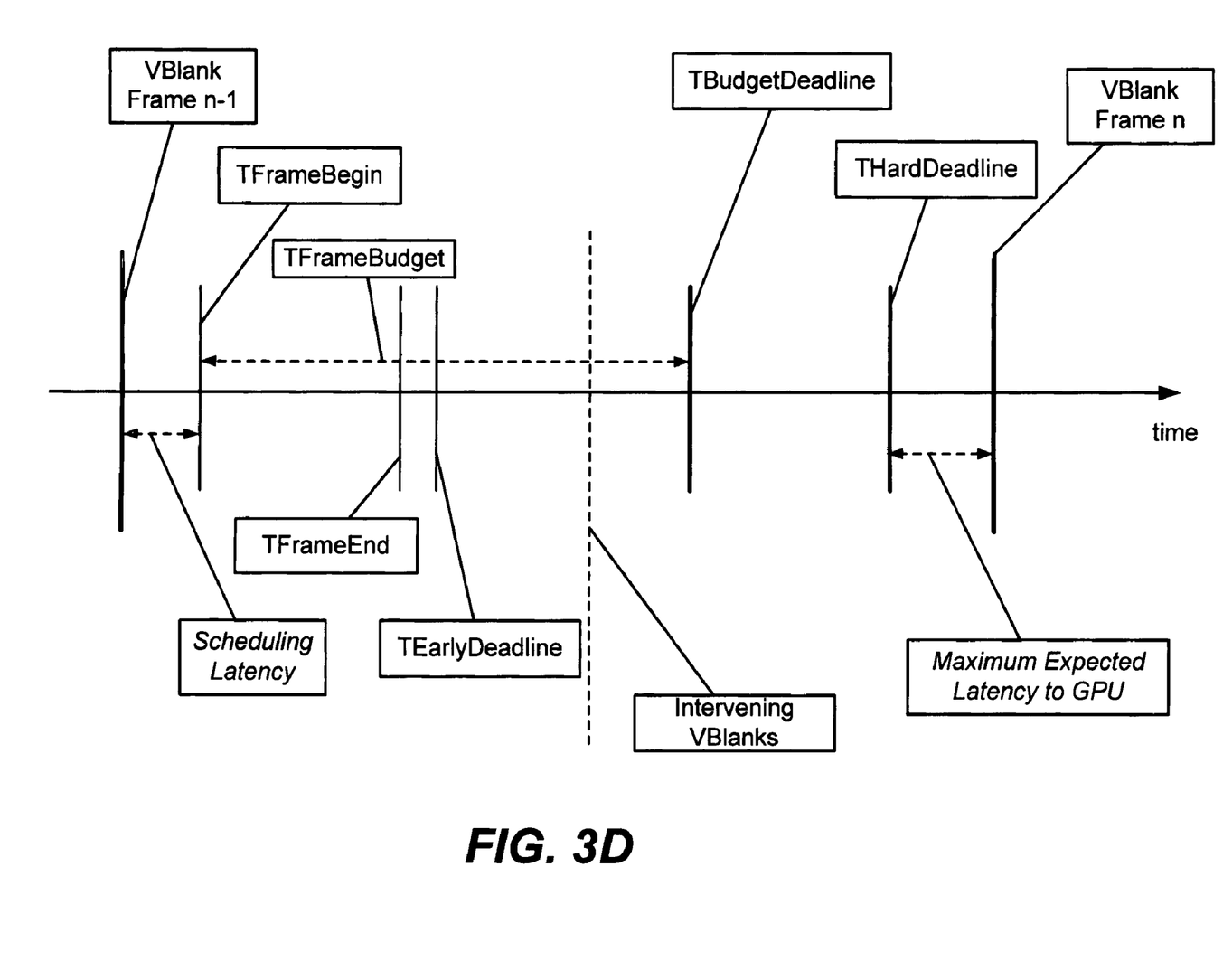

Similar timing information can be used is a slightly different manner to determine if the rate can be increased. For example, as represented in FIG. 3D, TEarlyDeadline is defined as TFrameBegin plus TFrameBudget/2 (or some other suitable fraction). If TFrameEnd is less than TEarlyDeadline (FIG. 3D), the system can potentially complete two frames within the budgeted time. The adaptive scheduler 210 will consider increasing the rate of frame composition if below the early deadline, and if currently composing slower than the monitor refresh rate. Note that using the elapsed time for a frame to determine if it can run at a faster frame composition rate depends on the rendering time being related to system load. Further note that in an alternative system, the adaptive scheduler 210 may periodically or occasionally attempt to increase the frame composition rate, even if not regularly finishing by the early deadline (TEarlyDeadline).

The system integrates waiting for Vertical Blank (VBlank) with waiting for new work, and can wait for these in either order, namely VBlank then work, or work then VBlank. The characteristics of the final frame experience are different, although they both use the same underlying mechanism. The difference is essentially how aggressive the system will try and get a frame done earlier, rather than later.

Waiting first for VBlank then work allows updates to get to the screen at the first possible instant. Because the VBlank wait is released at the beginning of the refresh frame period, the system can wake up anytime during that period if work arrives. If work arrives and there is still time to complete the frame, the lag added by the composition pass will be less than one frame and therefore appear to the application as no delay. However if the new work occurs slightly later, the delay will be at least one frame. The result is that the average latency is as low as possible but the variance is large.

Alternatively, waiting first for work then for VBlank means that each application frame will be delayed at least one frame. The system does not look for a Vblank, and therefore starts the frame processing until new work is actually received. The result is that at the beginning of every frame, the system processes any changes that occurred during the previous frame period (i.e., CRefresh refreshes). The delay between the application update and the composed frame is therefore less sensitive to the precise instant when an update is received.

The average latency of the work then VBlank approach is higher than the VBlank then work approach, but the variance is much smaller.

TFrameEnd and TBudgetDeadline are variables used to monitor performance, with performance adjusted via RComposition. More particularly, in one example, implementing an adaptive composition scheduler operates by recording where TFrameEnd occurred relative to TEarlyDeadline, TBudgetDeadline, and THardDeadline for every frame, (or at least some sampled amount of frames). Transient conditions on the system along with interaction with the system scheduler may vary these times significantly, whereby making decisions on a single measurement would cause oscillations in the frame composition rate. As a result, because consistency of the frame composition rate provides for smooth display, such frame composition rate adjustments are made less frequently by the adaptive scheduler 210, corresponding to some number of frames, refreshes and/or period of time. For example, the information may be maintained for some period of time, PSample, and the aggregate performance information measured over this time used to make any adjustments.

To determine how values are chosen, how the rate is adjusted and how this may interact with the system at large, actual performance data is measured by logic 212 (described below with reference to FIGS. 4A, 4B and 5) in the adaptive scheduler 210, to decide if the current frame composition rate is too fast, is correct, or is too slow. As described above, three threshold deadlines are computed or otherwise determined for each frame, namely TBudgetDeadline, THardDeadline, and TEarlyDeadline. As also mentioned above, because these values will often have significant variance, the decision is averaged or otherwise computed over some time or number of frames. These threshold deadlines are compared against TFrameEnd, and whether each threshold is exceeded is recorded.

To record the measured results, a circular buffer 214 of values or the like may be maintained by the adaptive scheduler 210 until some sampling limit is reached, e.g., an amount of time such as the last several seconds of frame time data. For example, if five seconds of data is saved for RComposition at sixty hertz, the buffer 214 will need three hundred slots, each with three values. The values themselves may be kept, but are not necessarily needed; rather what is maintained in one implementation is a yes/no recording of whether each value exceeded its threshold. This yes/no may be maintained in a single bit value, and reduces the storage requirement to nine-hundred bits.

Thus, each frame's slot records a bit value indicating whether TFrameEnd>TBudgetDeadline (indicating budgeted time exceeded), a bit value for whether TFrameEnd>THardDeadline (indicating a missed frame); and a bit value indicating whether TFrameEnd>TEarlyDeadline (indicating the composition did not finish early). Decisions may be made independently on the bits, to simplify the decision making process if these are separately maintained. In one implementation, the result corresponds to three buffers 214 rounded up to the next DWORD size; for each frame, the correct bit is indexed to for that frame to record the statistics for the frame.

Figure 4A:
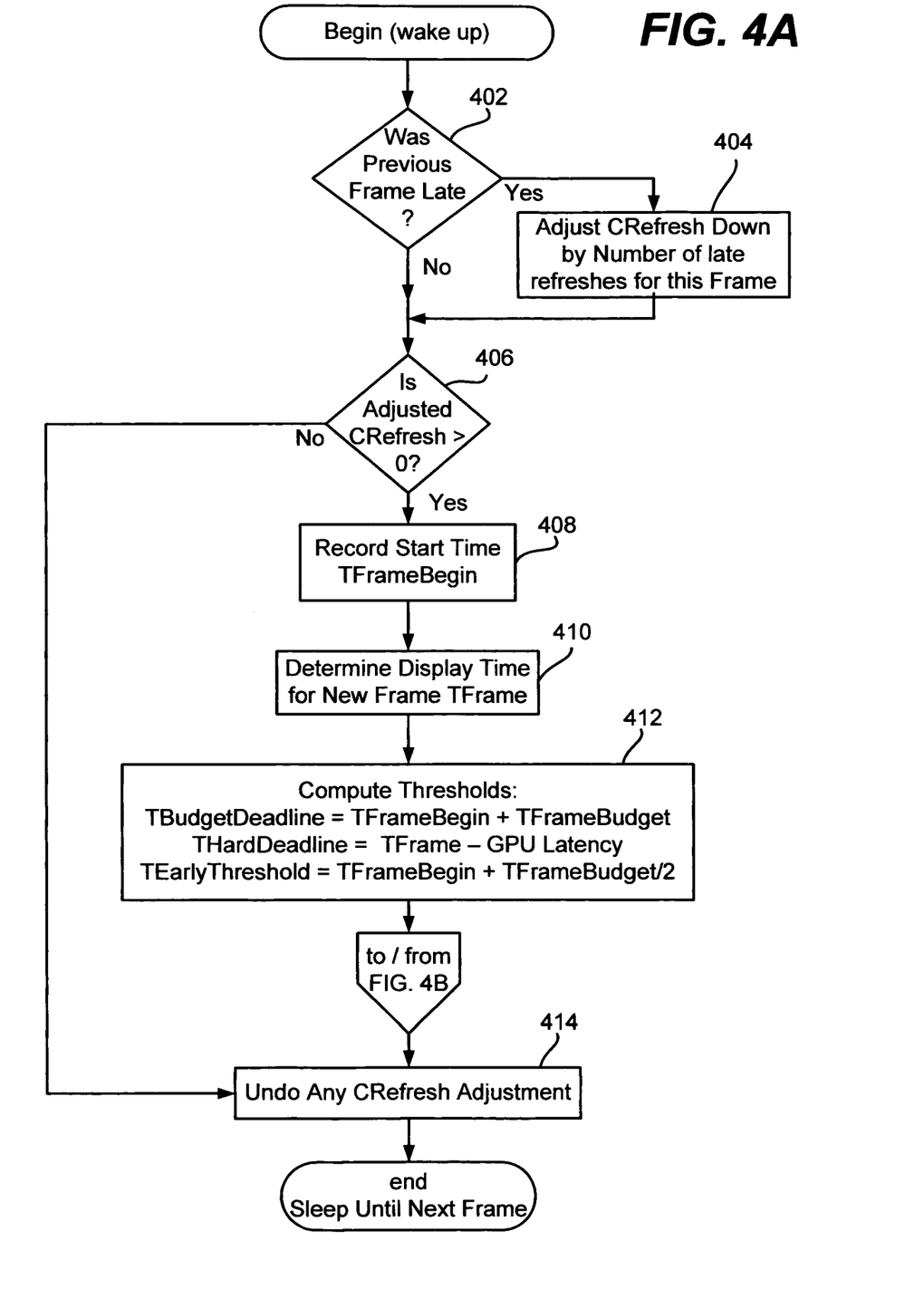
FIGS. 4A and 4B comprise a flow diagram showing example logic taken in a single frame to compute thresholds and other data.
Figure 4B:
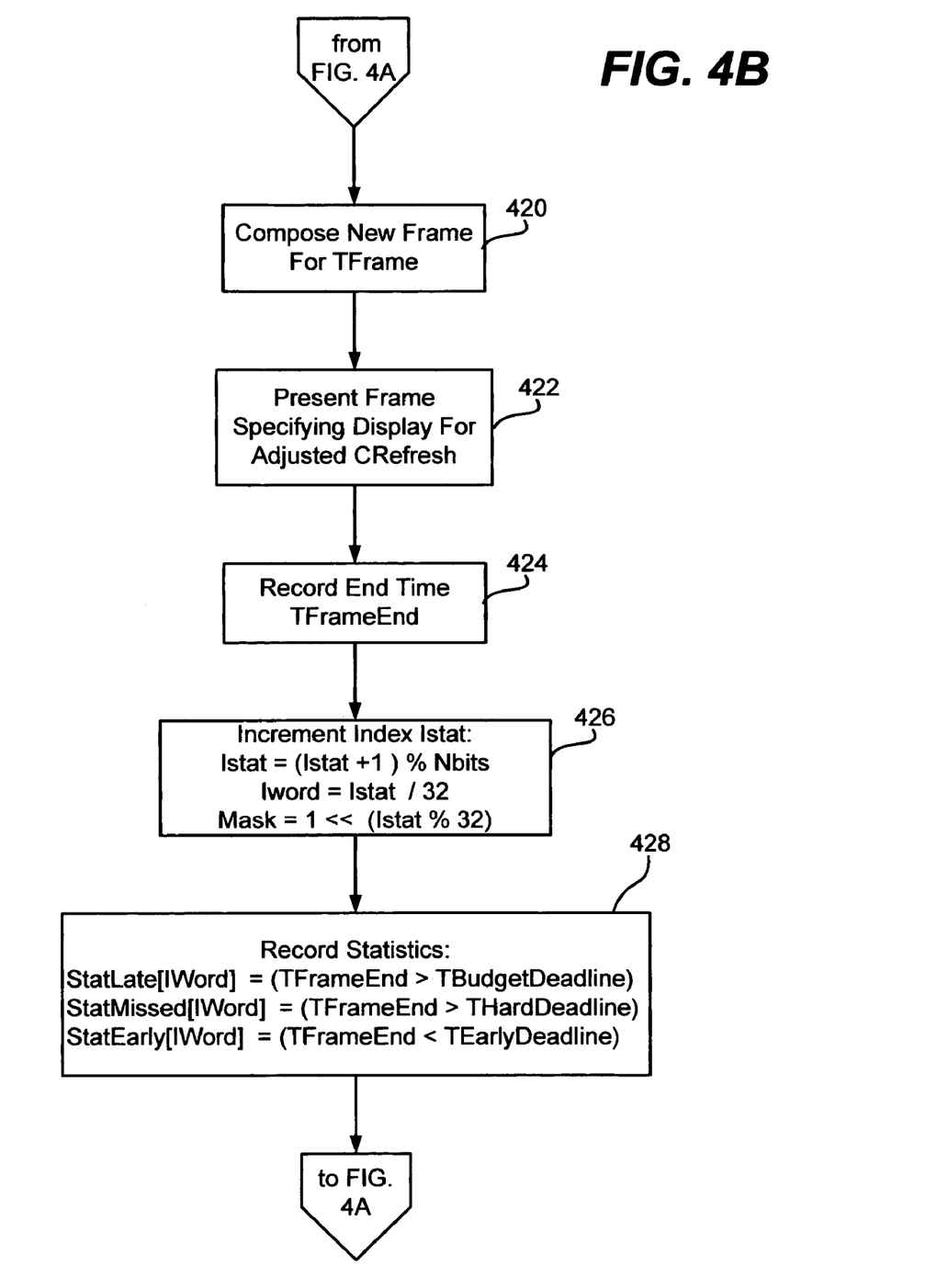

By way of example, consider the three-hundred slots having two buffers rounded to NBits=320 or ten DWORDS each, with entries referred to as StatLate, StatMissed and StatEarly. The buffer will be initialized to zero, and a count, IStat is kept for the current index into the buffer 214. The flow for a single frame is set forth below, and also represented in the flow diagram of FIGS. 4A and 4B:

1. Wake up
2. if previous frame was late
    a.    Adjust CRefresh down by the number of refreshes the thread woke up late for THIS FRAME
3. If adjusted CRefresh > 0
    a.    Record Start Time TFrameBegin
    b.    Determine the display time for the new frame TFrame
    c.    Compute the thresholds
        i.    TBudgetDeadline = TFrameBegin + TFrameBudget
        ii.    THardDeadline = TFrame − GPU Latency
        iii.    TEarlyThreshold = TFrameBegin + TFrameBudget/2
    d.    Compose new frame for TFrame
    e.    Present frame specifying display for adjusted CRefresh
    f.    Record end time TFrameEnd
    g.    Increment index IStat
        i.    IStat = (IStat +1 ) % NBits
        ii.    IWord = IStat / 32
        iii.    Mask = 1 << (IStat % 32)
    h.    Record Statistics
        i.    StatLate[IWord] = (TFrameEnd > TBudgetDeadline)
        ii.    StatMissed[IWord] = (TFrameEnd > THardDeadline)
        iii.    StatEarly[IWord] = (TFrameEnd < TEarlyDeadline)
4. Undo the adjustment to CRefresh from 2.a
5. Sleep until next frame As can be seen in FIGS. 4A and 4B, upon waking, step 402 determines whether the previous frame was late. If so, step 404 adjusts CRefresh down by one (or by some other suitable value) for this frame. CRefresh is used in two slightly different ways. First CRefresh indicates for how many monitor refreshes this particular frame should be displayed. Second, CRefresh is used as the denominator in the equation RComposition=RRefresh/CRefresh to compute the composition rate. CRefresh is adjusted down in step 404 to indicate that this particular frame must be shortened by the number of refreshes that the thread woke up late. If the resulting adjusted CRefresh is zero, as evaluated at step 406, it indicates that the thread woke up so late that the entire chance to process the frame was missed. At step 414 CRefresh is adjusted back to its value, that is, to its value before processing step 404 (corresponding to 2.a above) that if executed changed it, and returns to sleep. Otherwise, the process continues to step 408 to begin recording data.

To this end, the process in the adaptive scheduler 210 records the start time TFrameBegin (step 408) and determines the display time for the new frame TFrame (step 410). Step 412 computes the thresholds as set forth in FIG. 4A and the above computations.

Step 420 represents composing the new frame, with step 422 presenting the frame for display. Step 424 records the end time, whereby the amount of composition time is now known. Step 426 computes the index into the buffer 214, (which will vary based on the buffer 214 size, e.g., 32 is used for the DWORDS). Step 428 records the results (as a bit value dependent on each comparison) into the buffer 214 at the appropriate location based on the computed index.

Note that assuming tear reduction, StatMissed may need to be offset from the actual refresh time. This is because TFrameEnd is measured after TFrame (where TFrame is an accurate measurement of refresh).

Recording data as results of comparisons rather than actual measured times means that the raw times for comparisons are no longer available, however as will be understood, the exact times are not necessary to notice performance patterns, e.g., based on the count of bits in each slot. Three new thresholds are created based for evaluating against the recorded data bit counts, including CMissedFrames, which is the number of frames that can be missed in the last N frames before reducing the frame composition rate. CLateFrames is a threshold of the number of frames that can exceed the budget in the last N frames before reducing the frame composition rate. CEarlyFrames is the number of the last N frames that are finished early enough such that the next higher frame composition rate likely can be maintained.

To prevent tearing of the display, a Present wait for refresh (vertical sync) may be specified, corresponding to an arbitrary delay added into the recording of TFrameEnd. The amount of arbitrary delay depends on the amount of time between the previous TFrameEnd and the current TFrameBegin. Reducing the time between these two gives the best chance of meeting the next targeted refresh, but makes the current measurement look large. Increasing the time between the previous TFrameEnd and the current TFrameBegin reduces the inclusion of wasted time, assuming the refresh deadline is met, otherwise nearly an entire refresh period will be measured. Note that if there was only a need to measure whether the deadline for the next refresh was met, then the lag is not much of an issue, but because comparing against a smaller deadline allows other use of the GPU, the time waiting for refresh may be a problem.

There is also a consideration of what priority is given to the desktop window manager 204 composition. Assuming the desktop window manager 204 has the highest priority, a scheduler may allow for other GPU operation to take place while the desktop window manager 204 is waiting for synchronization.

The thresholds that are chosen determine how quickly the system will respond to changes in load. The first set, or per frame thresholds, are used to determine whether to count a frame as early, late or missed. The second set, or aggregate thresholds, determines how many of each category may occur in a sampling time period before action is taken.

The amount of time allowed to compose a frame determines the per frame thresholds. Two of the deadlines, TBudgetDeadline and TEarlyDeadline, are based on TFrameBudget. If TFrameBudget is too large, the system is more likely to glitch before adjusting the frame rate downwardly, and conversely will likely adjust the frame rate upwardly too soon. IF TFrameBudget is too small, the system will fall back to a lower frame rate, when perhaps the higher rate may be met, and will wait longer than necessary to increase frame rate once system load dies down. TFrameBudget may be specified as a percentage of the total composition frame time that can be devoted to composition by the desktop window manager 204. It is in some ways a measure of how important composition is relative to other processing. One reasonable starting value may be fifty percent, indicating that each frame is to be done roughly one-half of a frame ahead of time. Values may be discovered empirically, and may be a system tuning parameter.

MissedDeadline is based on the maximum latency expected of the GPU. If set too late, the system will not recognize missed frames; if set too early, frames that were actually displayed correctly will be assumed as missed. The latency may be estimated using information from the DirectX APIs, (e.g., one suitable underlying graphics infrastructure) with value chosen somewhat conservatively. For example, if the DirectX APIs provide a mechanism to report back display times (the Vsync) of previous displayed frames, then the latency can be computed within a fixed offset. If the exact time of the Vblank is also known, then the latency can be directly computed (by adding the difference of Vsync minus Vblank). Further the frame statistics (late, early and the like) can be refined. The exact refresh rate of the monitor can also be dynamically determined and used to improve the accuracy of the time estimates.

In one implementation, the compositor (e.g. of the desktop window manager) can send feedback such as events/notifications to an application program, to let the application program know that frames were dropped or late (and potentially by how much). From this the application program can further throttle the amount of work submitted to the compositor. If the next deadline time can be reported back to the application program (or can be estimated by the application program), then the application program can arrange to schedule a frame submission to maximize the available window for the compositor to pick up its frame (before THardDeadline). This should be between the time estimates of the previous deadline with the expected next deadline.

The aggregate thresholds are CLateFrames, CMissed-Frames and CEarlyFrames. CMissedFrames should be close to zero because little or no glitching is desired. Also, to avoid prematurely raising the frame rate, only to have to lower it right away, CEarlyFrames should be close to N. CLateFrames is a measure of how closely the per frame budget is to be enforced, with a reasonable value being midway between the others, that is, of N/2.

Turning to an explanation of using the data to make decisions on adjusting the frame rate up or down, rather than work with the frame rate, it is more straightforward to use the number of refreshes each frame is to be displayed, CRefresh. CRefresh can be thought of as the denominator of a fraction relating refresh rate to composition rate: RComposition=RRefresh/CRefresh. Thus, the larger the value of CRefresh, the lower the frame composition rate.

Figure 5:
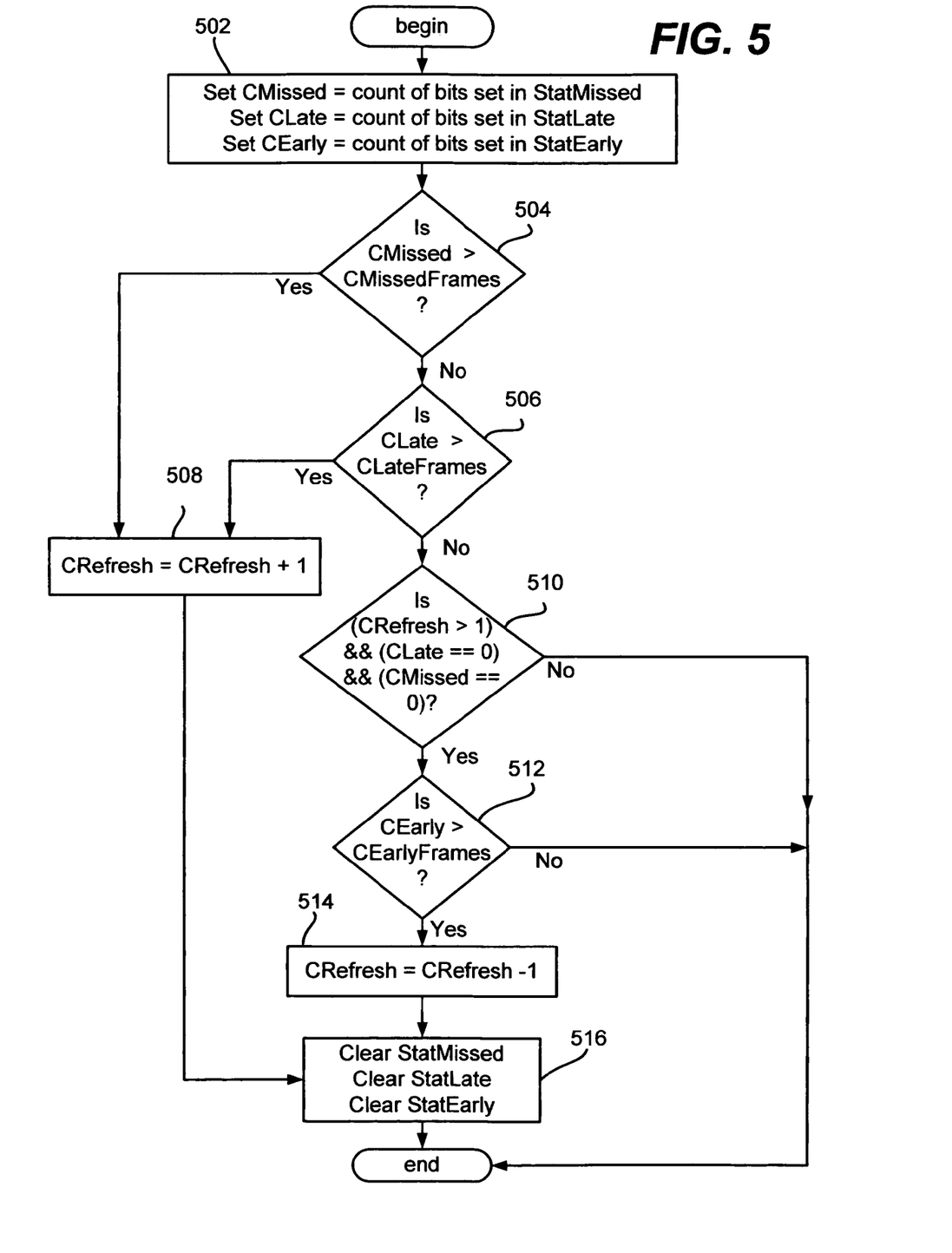
FIG. 5 is a flow diagram representing how a scheduler adapts the frame rate based on actual performance measured over a sampling time.

The flow for processing sample data is as follows and as represented in FIG. 5:

1. Set CMissed = count of bits set in StatMissed
2. Set CLate = count of bits set in StatLate
3. Set CEarly = count of bits set in StatEarly
4. If CMissed > CMissedFrames
    a. CRefresh = CRefresh + 1
    b. Clear StatMissed
    c. Clear StatLate
    d. Clear StatEarly
5. else If CLate > CLateFrames
    a. CRefresh = CRefresh + 1
    b. Clear StatMissed
    c. Clear StatLate
    d. Clear StatEarly
6. Else if (CRefresh > 1) && (CLate == 0) && (CMissed == 0)
    a. If (CEarly > CEarlyFrames)
        i. CRefresh = CRefresh −1
        ii. Clear StatMissed
        iii. Clear StatLate
        iv. Clear StatEarly As can be seen in FIG. 5, the initialization at step 502 sets the variables based on counting each of the bits in each category maintained in the buffer 214, including CMissed—the count of bits set in StatMissed; CLate—the count of bits set in StatLate; and CEarly—the count of bits set in StatEarly. Step 504 represents evaluating whether the count of missed frames CMissed is greater than the allowed threshold of CMissedFrames. If so, a number (CMissed) of glitches have occurred, and the composition refresh rate is too fast, and is slowed down by increasing CRefresh at step 508. Alternatively, if CLate (the count of bits set in StatLate) is greater than the allowed CLateFrames threshold, the composition refresh rate is too fast, and is similarly slowed down at step 508. Step 516 represents clearing the buffer or buffers 214 for the next sampling.

In the event that neither step 504 or step 506 achieves the threshold, there is a possibility that the rate is too slow. Step 510 is executed to evaluate whether CRefresh is greater than one (which means that CRefresh can be decreased), whether the number of late frames is zero, and whether the number of missed frames is zero. In such an event, it is likely that the frame rate can be increased. Step 512 determines whether the count of early frames (CEarly) achieves the threshold number of early frames, (CEarlyFrames). If so, step 514 increases the frame rate, e.g., up to the graphics refresh rate (of CRefresh equals one), by lowering the CRefresh denominator. Step 516 represents clearing the buffer or buffers 214 for the next sampling.

Note that a more complicated scheme may be used, e.g., one that allows rates such as a 24 hz composition rate on a 60 hz refresh rate. The result is a refresh-to-frame pattern ratio such as 2-3-2-3, where adjacent frames display for slightly different numbers of refreshes, e.g., two refreshes per one composed frame N, followed by three refreshes for the next composed frame N+1, followed by two refreshes for the next composed frame N+2, followed by three refreshes for the next composed frame N+3, and so on.

Thus, in this manner, frames of graphics and/or video content are composed at a smooth consistent frame rate, and the display and composition clocks are synchronized to some pattern. The adaptive scheduler 210 detects glitches, as well as early and late frame compositions, and adjusts the frame rate as necessary to maintain a smooth consistent frame rate.

EXAMPLE APIs

1) DwmGetTimeInfo

The desktop window manager will combine refresh rate information provided by IDirect3DDevice::GetDisplayMode with composed frame information to provide timing information to applications. The information is per HWND. Monitor information is based on the primary display. One example desktop window manager (DWM) API is shown below, followed by a description of its parameters:

```
typedef struct _D3DDISPLAYMODE
{
    UINT        Width;
    UINT        Height;
    UINT        RefreshRate;
```

```
        D3DFORMAT       Format;
} D3DDISPLAYMODE;
struct DWMTIMEINFO
{
        D3DDISPLAYMODE      mode;              // information returned by
                                               // IDirect3DDevice::GetDisplayMode
        UINT                composeRateNumerator;        // composition rate
        UINT                composeRateDenominator;      // expressed as a ratio to
                                                         // the refresh rate
        ULONGLONG           qpcVBlank          // QPC time at VBlank
        ULONGLONG           cRefresh;          // DWM refresh counter
        ULONGLONG           qpcCompose;        // QPC time at a compose time
        ULONGLONG           cRefreshFrame;     // Refresh count frame was composed
        ULONGLONG           cRefreshConfirmed;           // The target refresh count of
                                                         // the last frame confirmed
                                                         // completed by the GPU
        // Feedback on previous performance only valid on
        // second and subsequent calls
        ULONG                           cFramesDropped;  // number of frames that have been
                                                         // dropped because composition
                                                         // occurred too late since the
                                                         // last time the information was
                                                         // queried
        ULONG                           cFramesMissed;   // number of times an old frame
                                                         // was used because a new one was
                                                         // unavailable since the last time
                                                         // the information was queried
};
HRESULT DwmGetTimeInfo(HWND hwnd, DWMTIMEINFO *pinfo);
```

HWND hwnd;

The value indicates the window to which the missed and dropped frame information relates. A value of NULL can be supplied to retrieve just the global data.

DWMTIMEINFO

The structure returned by DwmGetTimeInfo includes information on the monitor and composition timing as well as feedback on previous performance. Each field of the structure is discussed below.

D3DDISPLAYMODE mode

The mode field is a D3DDISPLAYMODE structure containing information on the monitors resolution, formation and refreshrate. DwmGetTimerInfo fills in this field by calling Direct3DDevice::GetDisplayMode.

UINT composeRateNumerator

The composition rate is expressed as a ratio to the monitor refresh rate for accuracy. This field is the numerator of that ratio.

UINT composeRateDenominator

The composition rate is expressed as a ratio to the monitor refresh rate for accuracy. This field is the denominator of that ratio.

ULONGLONG qpcVBlank

The time in 100 ns units retrieved using QueryPerformanceCounter at the time the desktop window manager composition thread woke up due to the vblank event.

ULONGLONG cRefresh

Desktop window manager's refresh counter value for the same vblank as qpcVBlank

ULONGLONG qpcCompose

The QPC time when a previous frame was composed.

ULONGLONG cRefreshFrame

The desktop window manager refresh count when the composed frame is intended for display ULONGLONG cRefreshConfirm;

The target refresh count of the last frame confirmed to be completely processed by the GPU.

ULONGLONG cFramesDropped

The number of times an available frame was not displayed on time because composition occurred too late.

ULONGLONG cFramesMissed

The number of times an old frame because a newer one was unavailable. The value is since the last call to DwmGetTimeInfo.

2) DwmPresentInfo

In one implementation, a basic mechanism cannot support queuing multiple frames for later display. More information may be required about the application's intentions. For example, the system may need to know whether the present data is for immediate or delayed display, and if delayed, when it should be displayed and for how long. DirectX may have at least some of this information, however the desktop window manager, may, for example, provide the following API or the like to allow applications to provide this information. Note that in this example, the information supplied is used until the next call:

```
HRESULT DwmPresentInfo(
        HWND            hwnd;              // The HWND this applies
                                           // to queue
        BOOL            fQueue;            // frames for later display.
        ULONGLONG       cRefreshStart;     // The DWM refresh count
                                           // when the
                                           // next frame should be first
                                           // displayed
        ULONGLONG       cSourceRateNumerator;      // Rate in fps of
                                                   // the source
                                                   // material
        ULONGLONG       cSourceRateDenominator;
        UINT            *pcBuffer          // IN: requested number frames
                                           // to buffer
```

```
                                    // OUT: Number of frames that will
                                           be buffered
)
```

HWND hwnd;

The value identifies the window for which the supplied information is intended. The calling process needs to own this window.

BOOL fQueue;

The value indicates if frames presented after this call should be queued to a new surface or overwrite the current contents. If FALSE is specified it reverts to standard redirection with no buffering. Any outstanding buffers maintained by the desktop window manager are released.

ULONGLONG cRefreshStart;

The desktop window manager refresh count at which the next frame displayed should be first displayed. This only applies if the value of fQueue is TRUE.

If the refresh does not correlate to the start of a desktop window manager frame the supplied frame may be presented earlier.

If cRefreshStart is less then the current time. The desktop window manager may display the wrong frame or no frame at all until the application catches up.

ULONGLONG cSourceRateNumerator;

ULONGLONG cSourceRateDenominator;

The rate in frames per second of the source material expressed as a ratio. For example, if the material is a film, this might be 24. The ration of the cSourceRate to D3DDISPLAYMODE.RefreshRate will determine how long each presented frame is displayed. The desktop window manager will attempt to synchronize its composition rate with this (or a multiple of this rate) if possible.

UINT *pcBuffer;

The application requests the given number of frames to be buffered. The value on return is the actual number that will be buffered.

The API will work with basic BLT-based redirection. The overhead of an extra BLT from the application's surface to the desktop window manager is therefore still incurred. However, the cost of that BLT relative to GPU capabilities is small.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer-readable storage medium having computer-executable instructions for an adaptive scheduler to dynamically control the rate at which graphics frames are composed to ensure that each composed frame is complete and ready to display in time for a correct video refresh, the instructions which when executed in a computing environment perform a method comprising:

determining if a previous frame was late and, when so, decrementing a refresh value;

determining the time for a new frame by recording the begin frame time and the end frame time;

determining a threshold for a budget deadline, a threshold for a hard deadline, and a threshold for an early threshold;

composing a new frame and presenting the frame to a window manager for display;

recording the end time for the frame;

recording bits in a buffer for each threshold indicating whether the frame end time exceeded the budget deadline, whether the frame end time exceeded the hard deadline, and whether the frame end time exceed the early deadline; and adjusting the composition rate for frames based upon the count of the bits for each threshold recorded in the buffer.

2. The computer-readable storage medium of claim 1 further comprising obtaining a count of missed frames, a count of late frames and a count of early frames by evaluating actual frame composition times against time values corresponding to the hard deadline, the budget deadline, and the early threshold, respectively.

3. The computer-readable storage medium of claim 2 further comprising maintaining the count of missed frames, the count of late frames and the count of early frames by maintaining a bit array that contains results of comparisons for each actual frame composition time against the hard deadlines, the budget deadline, and the early deadline, respectively.

4. The computer-readable storage medium of claim 1 wherein adjusting the composition rate comprises decreasing the composition rate upon detecting a number of missed frames or a number of late frames, or increasing the frame rate up to a graphics subsystem refresh rate upon detecting a number of early frames.

5. The computer-readable storage medium of claim 1 wherein adjusting the composition rate comprises decreasing the composition rate when a count of missed frames achieves a missed threshold value, and if not achieved, decreasing the rate if a count of late frames achieves a late threshold value, and if the late threshold value is not achieved, increasing the rate up to a graphics subsystem refresh rate if a count of early frames exceeds an early threshold value.

6. A system for an adaptive scheduler to dynamically control the rate at which graphics frames are composed to ensure that each composed frame is complete and ready to display in time for a correct video refresh, the system comprising at least one computing device, computer-readable memory, and one or more computer processors upon which is executing components comprising:

a window manager that receives graphics instructions from application programs and composes frames of video data based on those instructions for sending to a graphics subsystem; and an adaptive scheduler coupled to the window manager that controls a rate of frame composition of the window manager by:

determining if a previous frame was late and, when so, decrementing a refresh value;

determining the time for a new frame by recording the begin frame time and the end frame time;

determining thresholds for a budget deadline, for a hard deadline, and for an early threshold;

composing a new frame and presenting the frame to a window manager for display;

recording the end time for the frame;

recording bits in a buffer for each threshold indicating whether the frame end time exceeded the budget deadline, whether the frame end time exceeded the hard deadline, and whether the frame end time exceed the early deadline;

adjusting the composition rate for frames based upon the count of the bits for each threshold recorded in the buffer.

7. The system of claim 6 wherein the buffer is a circular buffer.

8. The system of claim 6 wherein the adaptive scheduler includes comparison means for evaluating an actual frame composition time against a hard deadline time, a budget deadline time and an early deadline time.

9. The system of claim 6 wherein the adaptive scheduler adjusts the rate of composing frames by decreasing the rate upon detecting a number of missed frames or a number of late frames, or increasing the frame rate up to the graphics subsystem refresh rate upon detecting a number of early frames.

10. The system of claim 6 wherein the adaptive scheduler adjusts the composition rate by;

a) decreasing the rate when a count of missed frames achieves a missed threshold value, and if the missed threshold value is not achieved, by b) decreasing the rate if a count of late frames achieves a late threshold value, and if the late threshold value is not achieved, by c) increasing the rate if a count of early frames exceeds an early threshold value.

11. The system of claim 6 wherein the adaptive scheduler notifies at least one other component of a change in the rate of composing frames.

12. The system of claim 6 further comprising means for providing feedback to an application program such that the application program can adjust data submitted for compositing.

* * * * *

UNITED STATES PATENT AND TRADEMARK OFFICE
CERTIFICATE OF CORRECTION

PATENT NO. : 7,450,130 B2  
APPLICATION NO. : 11/228002  
DATED : November 11, 2008  
INVENTOR(S) : Swedberg et al.

Page 1 of 1

It is certified that error appears in the above-identified patent and that said Letters Patent is hereby corrected as shown below:

In column 16, lines 29-30, in Claim 3, delete "deadlines," and insert -- deadline, --, therefor.

In column 18, line 2, in Claim 10, delete "by;" and insert -- by: --, therefor.

Signed and Sealed this
Third Day of May, 2011

David J. Kappos
*Director of the United States Patent and Trademark Office*